United States Patent
Pahud et al.

(10) Patent No.: US 8,261,211 B2
(45) Date of Patent: Sep. 4, 2012

(54) MONITORING POINTER TRAJECTORY AND MODIFYING DISPLAY INTERFACE

(75) Inventors: Michel Pahud, Kirkland, WA (US); Oscar E. Murillo, Redmond, WA (US); Amy K. Karlson, Bellevue, WA (US); Benjamin B. Bederson, Chevy Chase, MD (US)

(73) Assignee: Microsoft Corporation, Redmond, WA (US)

( * ) Notice: Subject to any disclaimer, the term of this patent is extended or adjusted under 35 U.S.C. 154(b) by 507 days.

(21) Appl. No.: 12/571,448

(22) Filed: Oct. 1, 2009

(65) Prior Publication Data

US 2011/0083089 A1    Apr. 7, 2011

(51) Int. Cl.
G06F 3/048    (2006.01)
G06F 3/033    (2006.01)
G06F 3/041    (2006.01)

(52) U.S. Cl. ........ 715/856; 715/860; 715/764; 345/173; 345/157

(58) Field of Classification Search .................. 715/764, 715/856, 860; 345/173, 156, 157
See application file for complete search history.

(56) References Cited

U.S. PATENT DOCUMENTS

| | | | |
|---|---|---|---|
| 7,358,956 B2 | 4/2008 | Hinckley et al. | |
| 2002/0196238 A1* | 12/2002 | Tsukada et al. | 345/173 |
| 2006/0238519 A1 | 10/2006 | Westerman et al. | |
| 2008/0042989 A1 | 2/2008 | Westerman et al. | |
| 2009/0006101 A1 | 1/2009 | Rigazio et al. | |
| 2009/0007001 A1* | 1/2009 | Morin et al. | 715/773 |
| 2009/0015559 A1 | 1/2009 | Day et al. | |
| 2009/0027334 A1 | 1/2009 | Foulk et al. | |
| 2011/0138324 A1* | 6/2011 | Sweeney et al. | 715/800 |

OTHER PUBLICATIONS

"NYU's IMPAD Touch Surface Technology", Retrieved at <<http://www.touchusability.com/touchpads>>, Mar. 30, 2009, pp. 12.

Hinckley, et al., "Touch-Sensing Input Devices", Retrieved at <<http://research.microsoft.com/en-us/um/people/kenh/papers/touch-sensing.pdf>>, Proceedings of the SIGCHI conference on Human factors in computing systems: the CHI is the limit, May 15-20, 1999, pp. 8.

Blanch, et al., "Semantic Pointing: Improving Target Acquisition with Control-Display Ratio Adaptation", Retrieved at <<http://delivery.acm.org/10.1145/990000/985758/p519-blanch.pdf?key1=985758&key2=1556014421&coll=GUIDE&dl=GUIDE&CFID=37850891&CFTOKEN=66398107>>, Proceedings of the SIGCHI conference on Human factors in computing systems, vol. 6, No. 1, Apr. 24-29, 2004, pp. 519-526.

McGuffin, et al., "Acquisition of Expanding Targets", Retreived at <<http://www.dgp.toronto.edu/~mjmcguff/research/expandingTargets/AcquisitionOfExpandingTargets.pdf>>, Proceedings of the SIGCHI conference on Human factors in computing systems: Changing our world, changing ourselves, Apr. 20-25, 2002, pp. 8.

Zhai, et al., "Human on-Line Response to Target Expansion", Retreived at <<http://www.almaden.ibm.com/u/zhai/papers/TargetExpansion.pdf>>, Proceedings of the SIGCHI conference on Human factors in computing systems, Apr. 5-10, 2003, pp. 8.

(Continued)

*Primary Examiner* — Ting Lee

(57) ABSTRACT

Apparatus and methods for improving touch-screen interface usability and accuracy by determining the trajectory of a pointer as it approaches the touch-screen and modifying the touch-screen display accordingly. The system may predict an object on the display the user is likely to select next. The system may designate this object as a Designated Target Object, or DTO. The system may modify the appearance of the DTO by, for example, changing the size of the DTO, or by changing its shape, style, coloring, perspective, positioning, etc.

14 Claims, 7 Drawing Sheets

OTHER PUBLICATIONS

Cockburn, et al., "Human on-Line Response to Visual and Motor Target Expansion", Retrieved at <<http://delivery.acm.org/10.1145/1150000/1143093/p81-cockburn.pdf?key1=1143093&key2=6128014421&coll=GUIDE&dl=GUIDE&CFID=37854690&CFTOKEN=95516549>>, Proceedings of Graphics Interface 2006, Jun. 7-9, 2006, pp. 81-87.

Asano, et al., "Predictive Interaction Using the Delphian Desktop", Retrieved at <<http://pages.cpsc.ucalgary.ca/~ehud/Publications/Delphian_Desktop.pdf>>, Proceedings of the 18th annual ACM symposium on User interface software and technology, Oct. 23-26, 2005, pp. 9.

Vogel, et al., "Distant Freehand Pointing and Clicking on Very Large, High Resolution Displays", Retrieved at <<http://www.dgp.toronto.edu/~ravin/papers/uist2005_distantpointing.pdf>>, Proceedings of the 18th annual ACM symposium on User interface software and technology, Oct. 23-26, 2005, pp. 33-42.

Wilson, Andrew D., "Robust Computer Vision-Based Detection of Pinching for One and Two-Handed Gesture Input", Retrieved at <<http://research.microsoft.com/en-us/um/people/awilson/papers/uist%202006%20taffi.pdf>>, Proceedings of the 19th annual ACM symposium on User interface software and technology, Oct. 15-18, 2006, pp. 4.

Subramanian, et al., "Multi-Layer Interaction for Digital Tables", Retrieved at <<http://www.vip.id.tue.nl/papers/alucero06_uist.pdf>>, Proceedings of the 19th annual ACM symposium on User interface software and technology, Oct. 15-18, 2006, pp. 269-272.

Walker, Geoff, "The Microsoft Tablet PC", Retrieved at <<http://www.pencomputing.com/frames/tablet_pc.html>>, Pen Computing Magazine, Jul. 2001.

* cited by examiner

Figure 4A
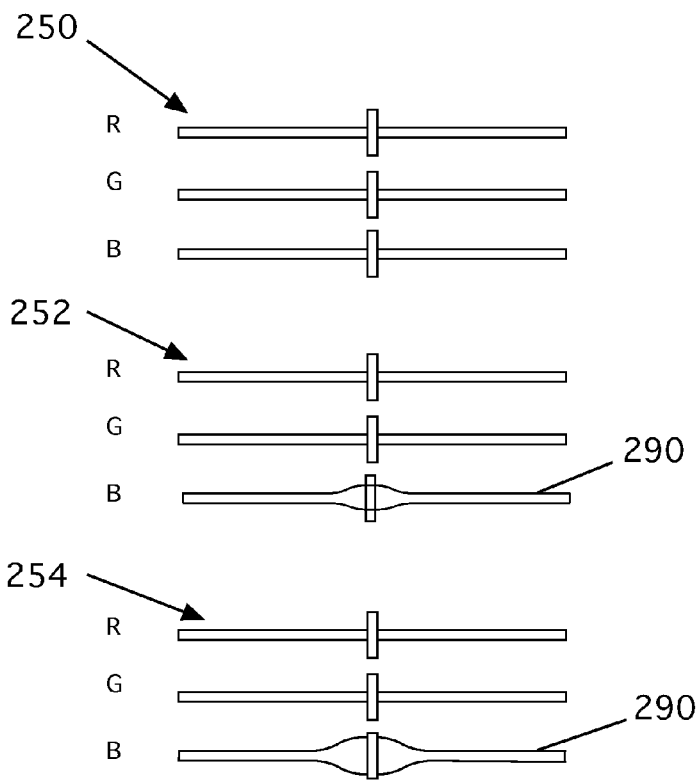
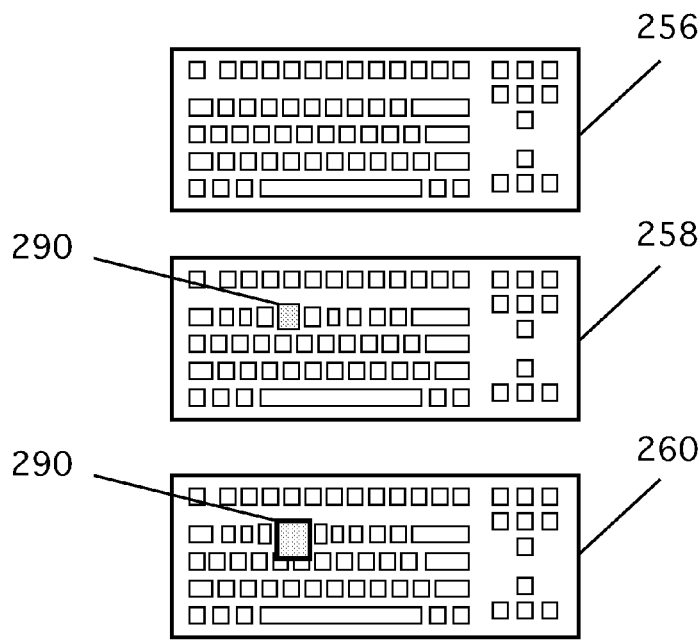
Figure 4B

MONITORING POINTER TRAJECTORY AND MODIFYING DISPLAY INTERFACE

TECHNICAL FIELD

This disclosure relates to methods and apparatus for monitoring a trajectory of a pointer and modifying a display interface accordingly.

BACKGROUND

Today's touch-screen-based user interfaces yield a significant number of user input errors, especially in small screen scenarios (e.g. mobile phones). Users frequently tap on the wrong control with their finger or stylus, and are forced to correct these errors after the tap has resulted in a selection on the touch-screen, which consequently reduces efficiency and end-user satisfaction. Granular controls, for instance sliders and knobs, are small and close together relative to the user's finger or a stylus and so are frequently selected or manipulated improperly, requiring correction. As an example, color palettes may include dozens of colors, and it is very hard to select a specific color on a small screen. Similarly, when a user means to type the letter "a" on a virtual QWERTY keyboard, it's common that the system recognizes the letter "s," because "s" is next to "a" on the keyboard, and the target touch areas for the letters are small relative to the user's fingertip. Users are then forced to press the delete or back button, slowing down task completion time.

Once the hand-held user input device, or pointer is in contact with the touch-screen, a cursor may become active on the screen and the user watches the cursor while moving the pointer along the screen. Some applications make it easier to select or manipulate an object as the cursor approaches the object on the screen display. But this is not helpful for a user who intends to select an object by tapping it rather than by sliding a pointer along the display.

The claimed subject matter is not limited to implementations that solve any or all disadvantages noted in any part of this disclosure.

SUMMARY

The present disclosure relates to apparatus and methods for improving touch-screen interface usability and accuracy by predicting the intent of the user and modifying the display accordingly. A system is disclosed that determines a 3-dimensional trajectory of a pointer, as the pointer approaches the touch-screen. The system may then predict an object on the display that the user is likely to select next. The system may designate this object as a Designated Target Object, or DTO. The system may modify the appearance of the DTO by, for example, increasing the size of the DTO, or by changing its shape, style, coloring, perspective, positioning, etc.

As a feature, the system may determine what type of pointer is being used, and change the appearance of the DTO based upon the pointer type as well. For example, the size of the DTO might be enlarged more when the pointer is a finger than when the pointer is a stylus, because of the greater precision of a stylus. The system may also take into account other factors, such as behavior patterns of the user or usage patterns for an application providing the touch-screen display.

The system may continuously update its DTO as the various factors change over time. The system may change the DTO if the trajectory towards the display changes, or it may deselect a target object if the pointer moves away from the display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 4A-4C are illustrative displays showing examples of display modification according to FIGS. 1-3.

DETAILED DESCRIPTION

Table of elements and reference numbers used in this disclosure:

| | |
|---|---|
| 10 | System |
| 12 | Computing device |
| 14 | Processor |
| 16 | Memory |
| 17 | Predictor/Adapter |
| 18 | Input/output interface |
| 20 | Pointer |
| 22 | Touch enabled display (touch-screen) |
| 24 | Pointer position detector |
| 26 | Bus |
| 28 | Application |
| 30 | Operating system |
| 104 | Physical position in space |
| 106 | Pointer type data |
| 108 | Position on touch screen |
| 112 | Pointer determination element |
| 116 | x, y, z position in space |
| 118 | Pointer type |
| 120 | x, y position of pointer on touch screen |
| 122 | Behavior analyzer |
| 124 | Behavior data |
| 126 | UI adapter |
| 128 | Display control signal |
| 130 | Touch screen input |
| 202 | Input trajectory element |
| 204 | Input trajectory data |
| 206 | Target object designation element |
| 210 | Stored data on pattern of use for application |
| 212 | Application pattern data |
| 214 | Stored data on past user patterns |
| 216 | User pattern data |
| 250-270 (even numbers) | Display examples |
| 290 | Designated target object |
| 302, 304, 306 | Display examples |

Figure 1:
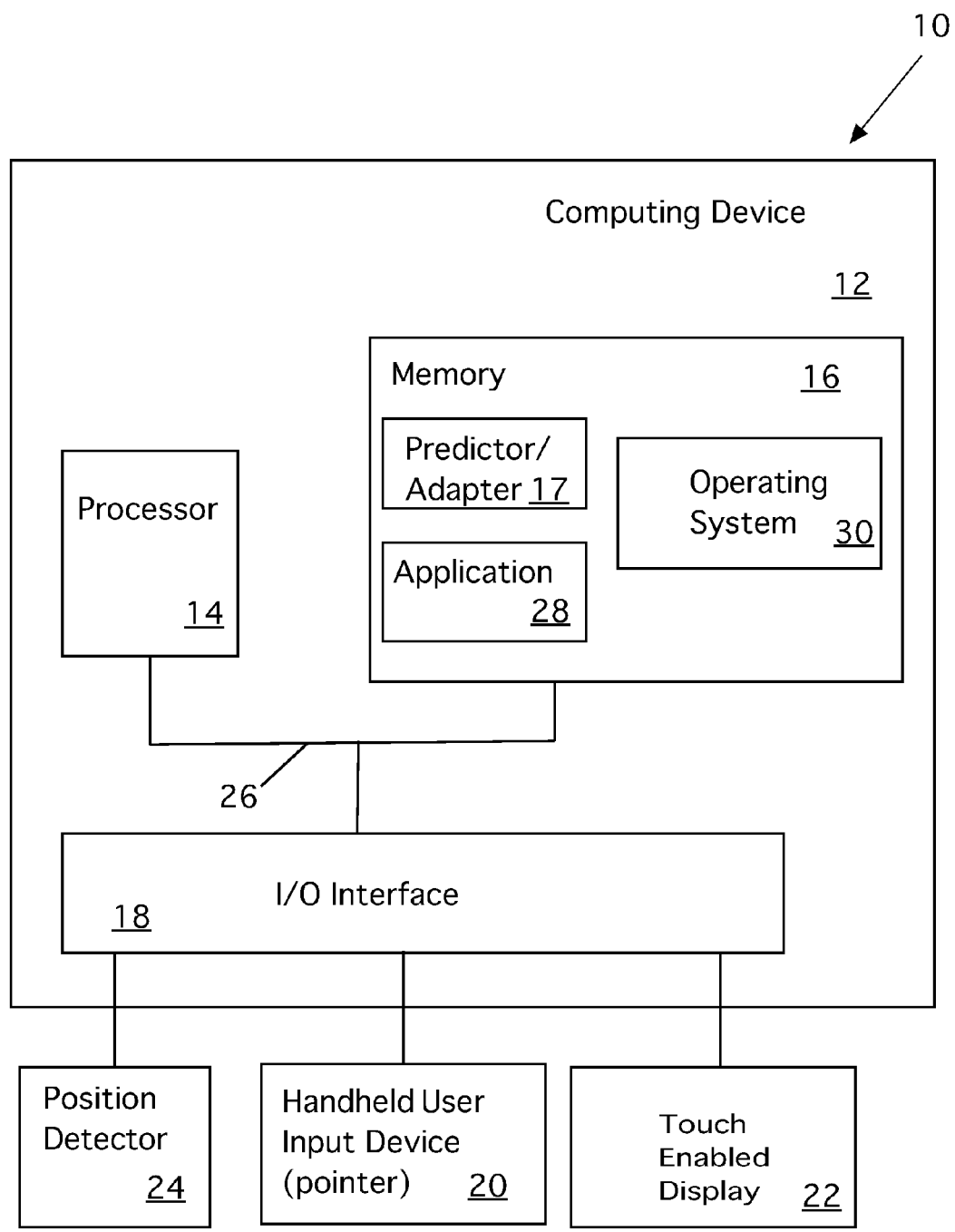
FIG. 1 is a block diagram showing an illustrative embodiment of a system for monitoring a pointer and modifying an associated display.

FIG. 1 is a simplified block diagram according to an illustrative embodiment of a system 10 for monitoring the 3-dimensional trajectory of a user pointer 20 and modifying an associated touch-screen 22 display. This is helpful when a user is using a touch-enabled display, such as a touch-screen tablet connected to a computer or a touch-enabled cell phone screen. As the user approaches the touch-screen with a pointer 20 such as an index finger or a stylus, the display changes to make it easier for the user to select objects on the touch-screen display. For example, if the trajectory of the pointer is tending towards a particular object on the screen, that object may be made larger or change color to indicate to the user that the trajectory is leading to that object, and to make the object easier to select.

System 10 typically includes, among other elements, a computing device 12 having a processor 14, memory 16, a predictor/adapter 17, an input/output interface 18, a user pointer 20, a user pointer position detector 24, and a touch enabled display 22, such as a touch-screen for a computer or a cell phone. Processor 14, memory 16, and I/O interface 18 are generally linked by a bus 26.

Position detector (e.g. depth detection camera) 24 detects the 3-dimensional position over time of a pointer 20 (such as a stylus or a user's index finger) as the pointer approaches the touch-enabled display (or touch-screen) 22. Predictor/adapter 17 is shown in more detail in FIGS. 2 and 3. Briefly, the path of the pointer 20 can be used to predict the user's intent, for example by predicting the next object on the touch-screen 22 that the user will select (the designated target object, or DTO). For example, the system might determine the 3-dimensional trajectory of the pointer, and determine that an object is located nearest to the end of the trajectory, and designate that object as the DTO 290 (see FIGS. 4A-C and 6A-F). Then, the display interface may be modified according to the prediction, for example by increasing the size of the DTO to make the DTO easier to select, and to indicate to the user that the DTO is at the end of the current trajectory, so the user can change the trajectory if the DTO is not the object the user intends to select. Note that the DTO may be a single object or portion of an object on the screen, or could be a group of elements, a section of a display, or an application window.

While predictor/adapter 17 is shown as a separate software component running from memory 16, those skilled in the art will appreciate that predictor/adapter 17 could be built-in to an application 28 or the operating system 30 if desired. Or, predictor/adapter 17 could be implemented on a chip.

In some embodiments, touch-screen 22 is a standard touch-enabled display connected to a computer via a USB and VGA interface or the like. Touch-screen 22 then interfaces with the conventional I/O interface 18 as usual, through control signals from I/O interface 18 to touch-screen 22. The display modifications are accomplished by adjusting the rendering instructions 130 provided by I/O interface 18. In this case, no special cables or connectors are required to implement the system. Examples of touch-screens include HP TouchSmart® PCs, Windows® 7 touch-enabled laptops (e.g. Lenovo® x200) Fujitsu® touch-screens and touch overlays, conductive film overlays, etc.

Similarly, position detector 24 might comprise a depth detecting webcam built-in to the display, or it could comprise a discrete depth detection camera connected to the computer via USB or firewire or the like. An example of a position detector is the 3DV Systems ZCam™. Position detector 24 might also comprise a transceiver attached to the pointer 20, such as a Wacom Graphire® pen with Bluetooth®.

Figure 2:
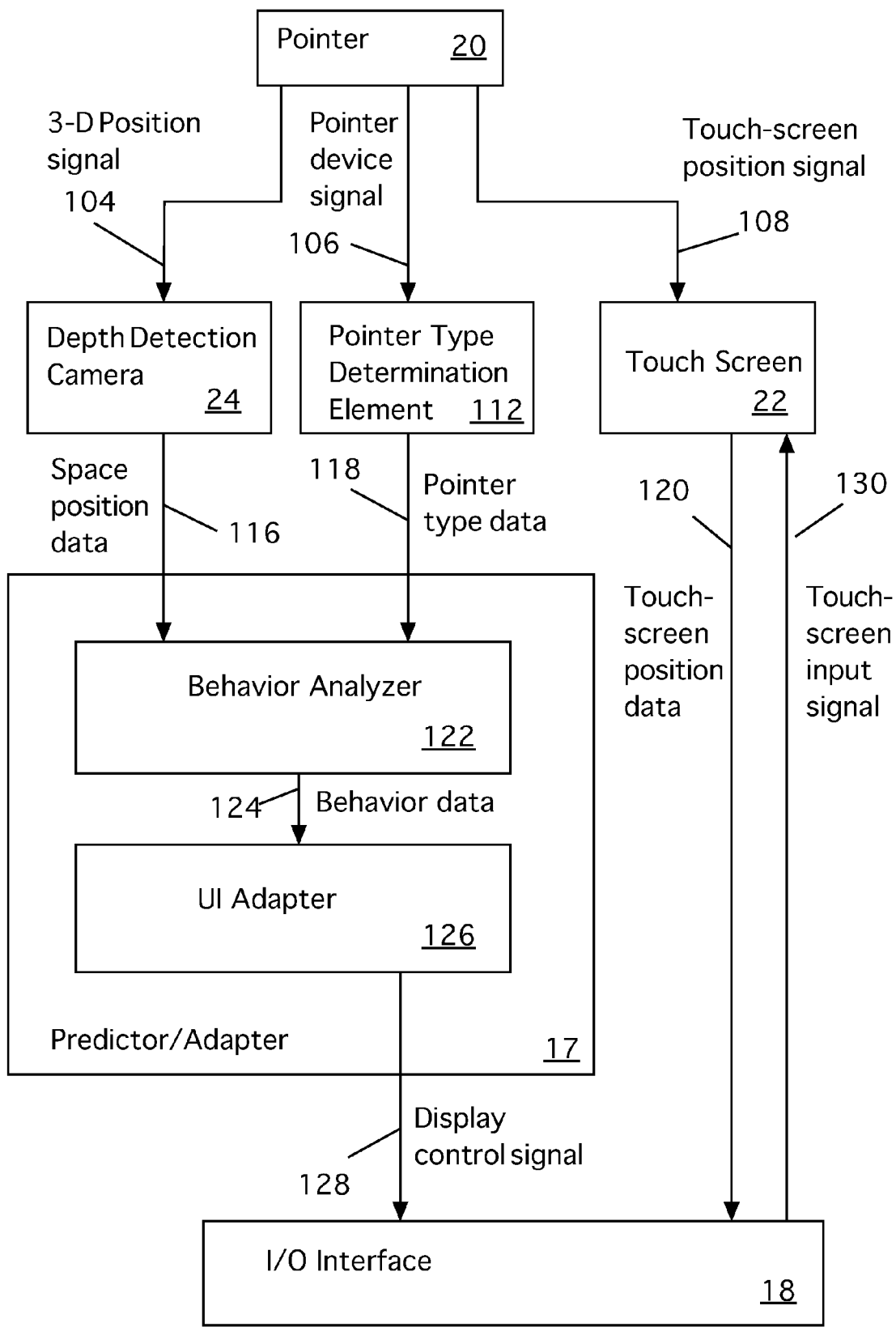
FIG. 2 is a schematic view showing details of an example of the system of FIG. 1.

FIG. 2 is a schematic view showing possible details of the system of FIG. 1. In the example of FIG. 2, pointer 20 provides three types of input signal. Prior to contact between pointer 20 and touch-screen 22, a pointer position detector 24 (in this case a depth detection camera) detects the physical position 104 of pointer 20 in space. It provides data 116 on the 3-dimensional position of the pointer in space as it approaches the screen but before it touches the screen. For example, the x, y, z position of pointer 20 is provided to behavior analyzer 122 within predictor adapter 17. The x and y data could be analogous to the x-y position on the screen (up-down and right-left parallel to the screen), while the z data could indicate distance from the screen (perpendicular to the screen). As an alternative, polar coordinates could be provided.

In the example of FIG. 2, signal 106 regarding the type of pointer 20 is also detected, and the particular pointer type 118 is provided as an input to behavior analyzer 122. Pointer type data 106 may be detected by pointer determination element 112. In the example where the pointer comprises either a finger or a stylus, pointer type data might comprise a signal from a transceiver in the stylus when a stylus is used, and no signal when a finger is used. Thus pointer determination element 112 provides a signal 118 to behavior analyzer 122 indicating that pointer 20 is a finger or a stylus. Those skilled in the art will appreciate that other types of pointers 20 may also be used (for example two fingers, other body parts, or various drawing or painting devices) and that a variety of methods may be used to indicate the type of device. For example, a user might wear a ring having a transceiver to indicate the pointer is a finger. Or the user might select an icon to manually indicate the pointer 20 prior to using the device. Or, an IR detector might be used to distinguish the pointer 20 type.

After pointer 20 comes into contact with touch-screen 22, the 2-dimensional position 108 of pointer 20 on touch-screen 22 is provided as, for example, x, y data 120 to I/O interface 18. The application providing the display on touch-screen 22 may control the display at this point, so this x, y data 120 isn't necessarily provided to behavior analyzer 122.

Figure 3:
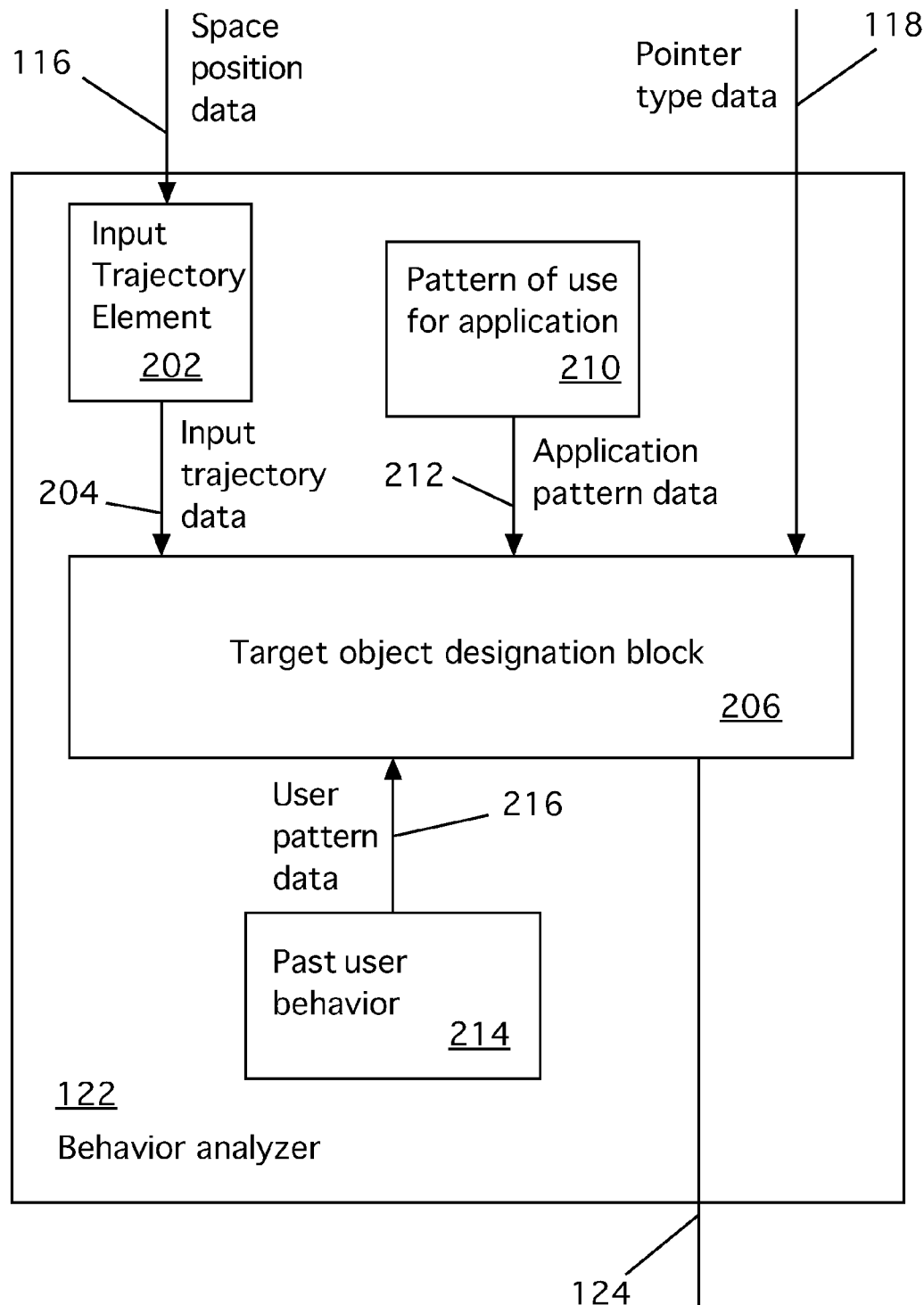
FIG. 3 is a schematic view of a behavior analyzer such as that shown in FIG. 2.

Behavior analyzer 122 is shown in more detail in FIG. 3. Briefly, behavior analyzer 122 takes data from pointer 20 (such as pointer position 116 and pointer type 118) and combines it with any other data available (such as patterns of usage for the currently running application or stored data about the user) to generate behavior data 124 and to provide it to UI adapter 126. UI adapter 126 provides a display control signal 128 to I/O interface 18. I/O interface 18 provides touch screen input 130 to touch-screen 22 in turn.

FIG. 3 is a schematic view of an example of a behavior analyzer 122 of FIG. 2. In the example of FIG. 2, behavior analyzer 122 includes an input trajectory element 202, which computes 3-dimensional trajectory data 204 for pointer 20 as it approaches touch-screen 22. The term "trajectory" is intended to encompass the path taken by the pointer through space over time, and could include curved paths. Trajectory data 204 might include position, velocity, and acceleration.

Target object designation element 206 uses trajectory data 204 (among other potential inputs) to make a determination as to what object on the display of touch-screen 22 will likely be selected next by a user. In the simplest case, the object that would be contacted if the present trajectory continued unchanged becomes a designated target object (DTO) and behavior data 124 indicates the DTO to UI adapter 126.

However, behavior analyzer 122 may take other input and stored data into account in generating behavior data 124. Pointer type 118 might bias the selection of the DTO. For example, behavior analyzer 122 might indicate the DTO sooner when a stylus is used rather than the user's finger. Or certain objects might not be eligible to be DTOs for certain pointer types. For example, in a painting program, a finger painting icon might not be selectable or might be less likely to be selected, if the pointer was a stylus rather than a finger. Or certain small dials and sliders in a music application might not become DTOs when a finger is used because of its lesser precision.

Further, behavior analyzer 122 might have past user behavior stored data 214 indicating that this user skews upward on the display when using a stylus, or that this user tends to select certain objects most frequently. Then user pattern data 216 might be used to bias how the DTO is selected. As another example, behavior analyzer 122 might have stored data 210 that indicates when this application is used, a particular sequence of objects is often selected. Then application pattern data 212 might be used to bias how the DTO is selected. Those skilled in the art will appreciate a number of other ways in which behavior analyzer 122 might influence behavior data 124. Behavior analyzer 122 will generally continue to refine its determinations, so the DTO or other behavior data 124 may change as the pointer approaches the touch-screen.

Figure 4C:
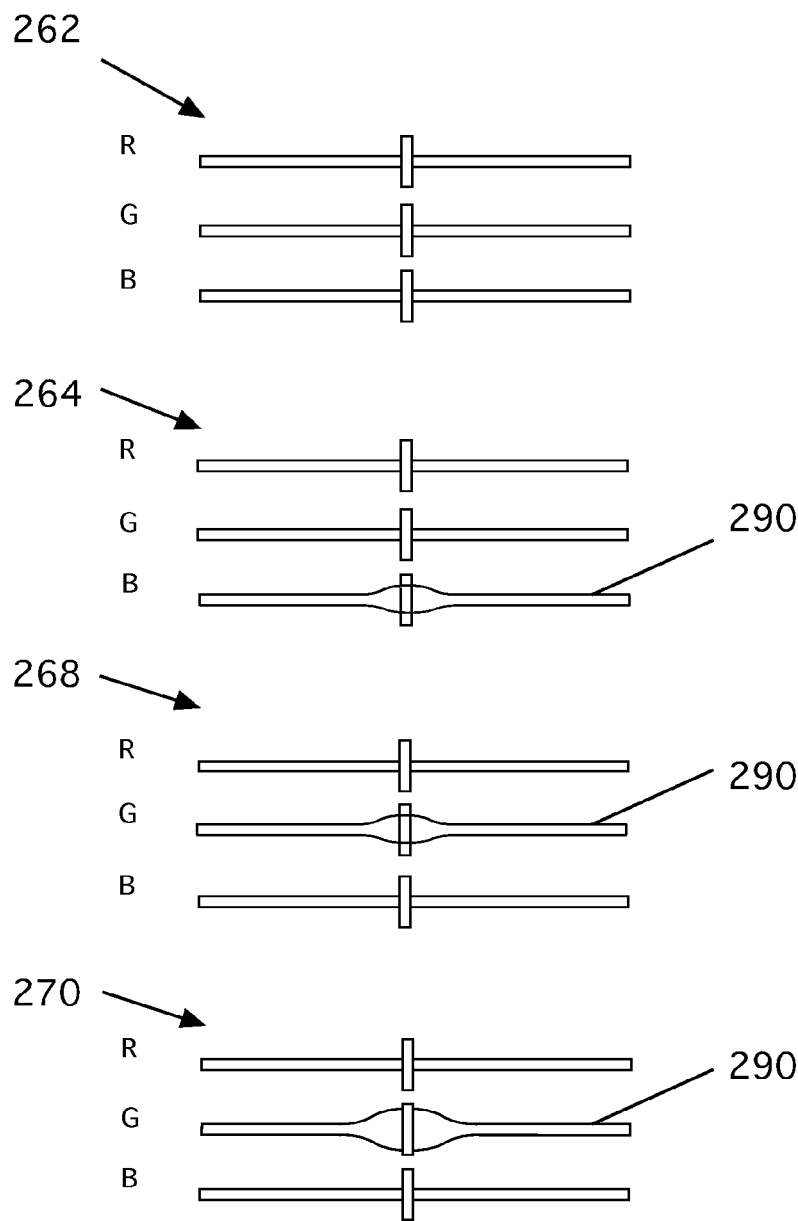

FIGS. 4A, 4B, and 4C are illustrative displays showing a display modification according to the system of FIGS. 1-3. In FIG. 4A, three slide controls for adjusting color balance (red, green, and blue) are shown in a default configuration in the top display 250. In the middle display 252, pointer 20 is on a trajectory toward the bottom slide control, and the bottom slide control has become the designated target object (DTO) 290 and has increased in size where the pointer is aiming. The user has an opportunity to course correct at this point, if the DTO is not the user's intended target object (see FIG. 4C). In the bottom display 254 of FIG. 4A, the bottom slide control has increased in size even further as the pointer 20 touches the touch-screen 22.

FIG. 4B shows a second example of a display modified by the system of FIGS. 1-3. In the top-most display 256, an onscreen keyboard is in its default state, with all letters the same size. In the middle display 258, one of the letters has become the DTO 290. It has grown somewhat in size. In this example, the letters on either side of the DTO are also larger than usual, though not as large as the DTO. In the bottom display 260, the DTO reaches its maximum size as it is selected. It also has a heavier black outline to indicate the pointer has touched the screen and selected the object that was the DTO (also called "press state"). In this example, the letters on either side of the DTO letter are somewhat taller than usual, and are compressed horizontally to prevent the on-screen keyboard from being distorted. In this example, the coloring or shading of the DTO letter is also modified to make it more distinct to the user. Those skilled in the art will appreciate that many other visual cues may be used to indicate the DTO 290 to the user and make it easier to select, and if desired to indicate when a DTO is selected. For example, shape, style (e.g. flat versus convex or font style for text), or positioning in z-space (e.g. perspective, or 3-dimensional appearance on the screen) are useful indicators. Other objects or portions of objects besides the DTO may also change in appearance, for example by moving away or shrinking.

FIG. 4C shows a third example of a display modified by the system of FIGS. 1-3, wherein the user changes the DTO 290 by changing the trajectory of the pointer. As in FIG. 4A, three slide controls for adjusting color balance (red, green, and blue) are shown in a default configuration in the top display 262. In the second display 264, pointer 20 is on a trajectory toward the bottom slide control, and the bottom slide control has become the DTO 290 and has increased in size. In this case, the user does not want to select the bottom slide control, but rather the middle slide control. So the user changes the trajectory of the pointer such that the trajectory is directed toward the middle slide control. In the third display down, the middle slide control has become the DTO 290. In the bottom display 270 of FIG. 4C, the bottom slide control has increased in size even further as the pointer 20 touches the touch-screen 22.

Figure 5:
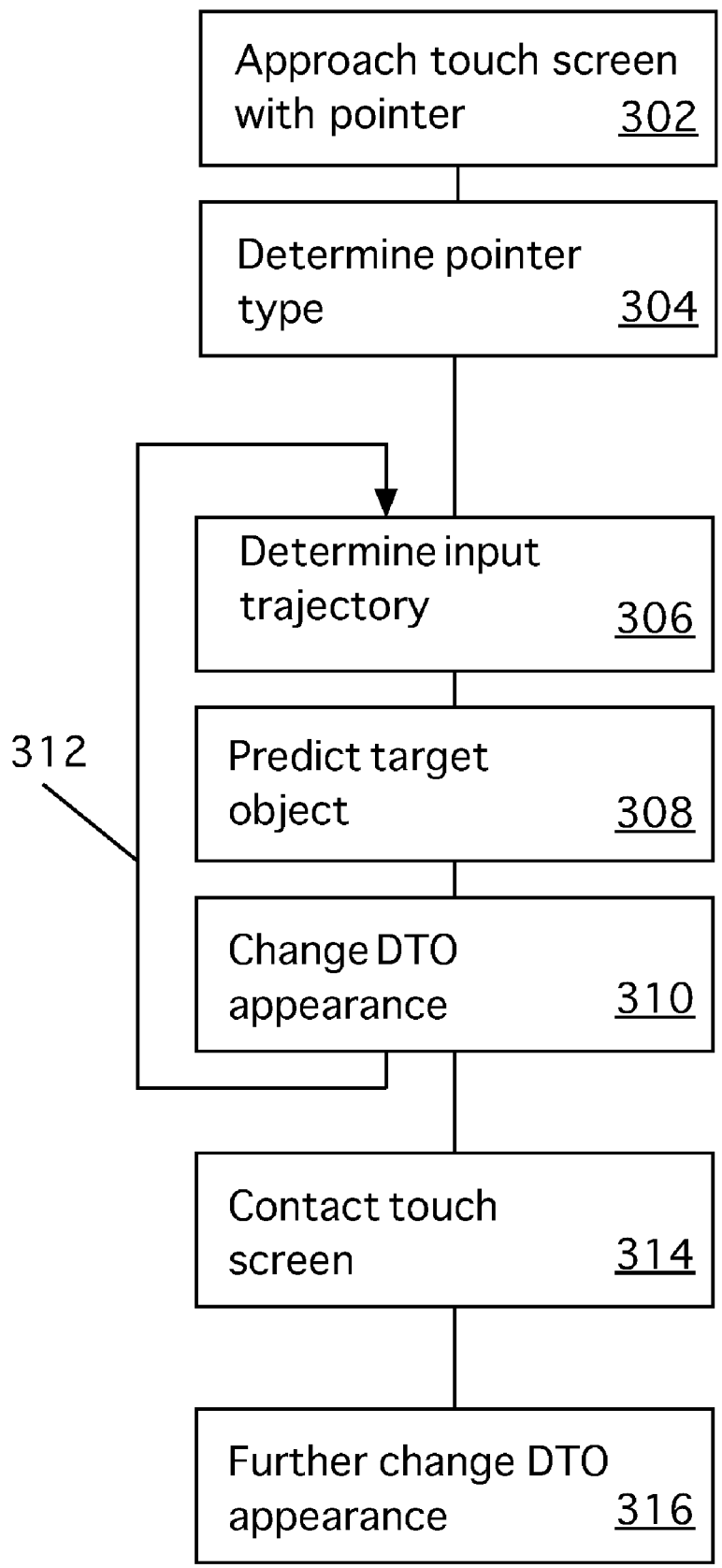
FIG. 5 is a flow diagram showing steps performed by an illustrative embodiment of the system of FIGS. 1-3.

FIG. 5 is a flow diagram showing steps performed by an illustrative embodiment of the system of FIGS. 1-4. This example shows the process of changing the appearance of a designated target object 290 on touch-screen display 22, as shown in FIGS. 4A-C. Step 302 detects an approaching pointer 20 as it approaches touch-screen 22. Pointer determination element 112 (if used) determines what pointer 20 is being used in step 304. Pointer position detector 24 and behavior analyzer 122 determine 3-dimensional input trajectory 204 in step 306. In step 308, behavior analyzer 122 predicts the target object that will be selected by the user next (designated target object, or DTO). The appearance of the DTO is changed in step 310 by UI adapter 126, for example by increasing its size. As discussed above, other aspects of a DTO may be changed, such as color or shape. Loop 312 indicates that the behavior analyzer 122 may continue to refine the behavior data 124 it generates. For example, if trajectory 204 changes, the DTO may change. If pointer 20 moves away, the DTO appearance may return to default.

In step 314, pointer 20 contacts touch-screen 22. Generally, the application providing the display on touch-screen 22 takes control of the display at this point. Optional step 316 further changes the DTO appearance to provide feedback to the user that the DTO has been selected.

Figure 6A:
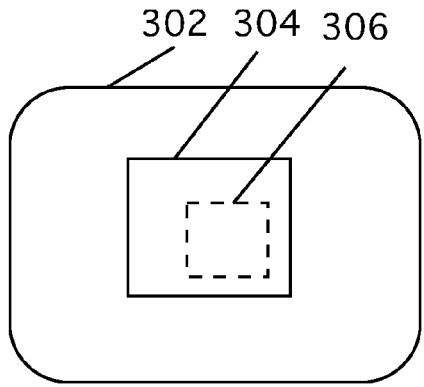
FIGS. 6A-6F are illustrative displays showing further examples of display modification according to FIGS. 1-5.
Figure 6D:
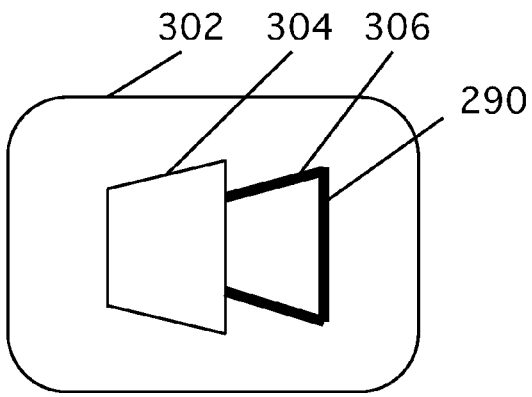
Figure 6B:
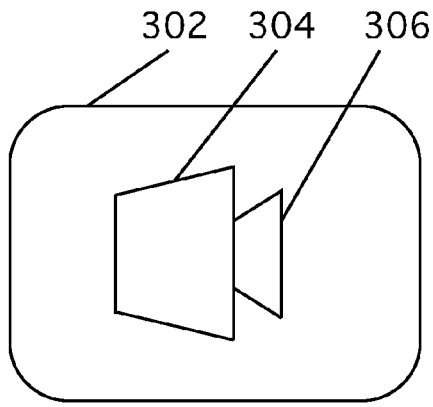

FIGS. 6A-6F show another example of how a display 302 might be modified according to an embodiment of a display modifying system 10. FIGS. 6A-6F show how a curved trajectory can be used to select an object 306 that is initially hidden behind another object 304. In FIG. 6A, object 306 is hidden behind object 304. For example, a chat window might be hidden behind a drawing application window. A particular trajectory executed by pointer 20 (for example a quick, curved trajectory) might be used to indicate to the system that the user wishes to see both the front window and the rear window. In FIG. 6B, the user can see both windows. For the user, it is as if the display rotated sideways so the original front window 304 is to the left and the original back window 306 is to the right.

Figure 6E:
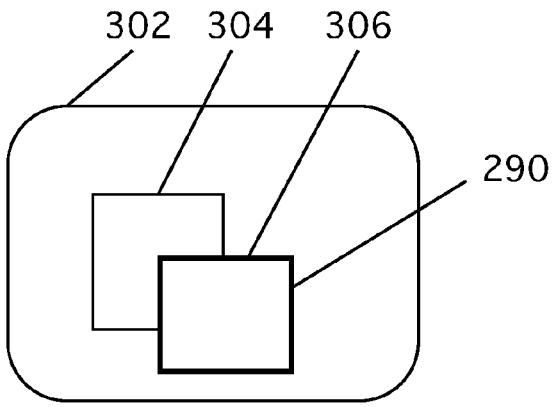
Figure 6C:
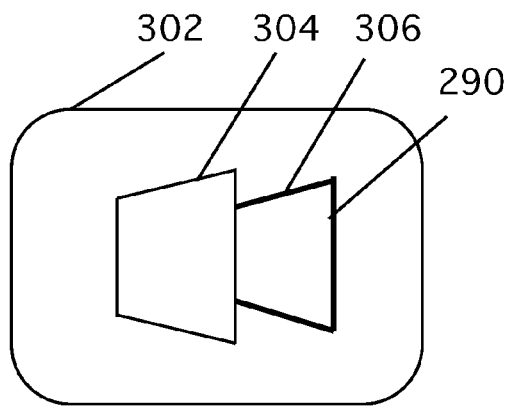

FIG. 6C shows window 306 as it becomes the DTO 290. In FIG. 6C this is indicated by a darker outline around the window, and the increased size of the window. In FIG. 6D, the user selects window 306. The press state of window 306 is indicated by an even thicker line around the window.

Figure 6F:
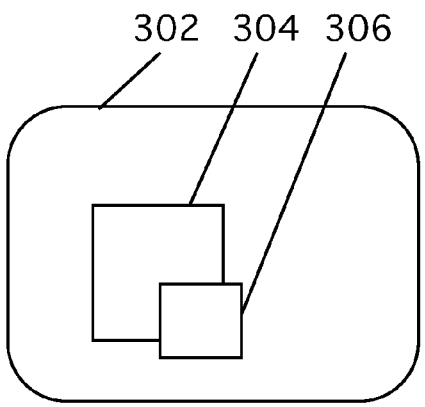

FIG. 6E shows window 306 after it has been selected, so it is now the front window. Window 304 is back to its default appearance, but now is the rear window. The user is still manipulating window 306, so it is still increased in size and has a darker outline, as it is still DTO 290. In FIG. 6F, window 306 has been deselected (or un-designated as DTO), so it is back to normal size and appearance. In this example, window 306 is still the front window, as it was the last window used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method of comprising the steps:
sensing a pointer spaced apart from a display screen of a touch-enabled device as the pointer approaches the display screen;

determining a 3-dimensional trajectory of the pointer in space;

determining a pointer type;

designating a target object on the display screen based upon the determined pointer type and the determined 3-dimensional trajectory while the pointer is spaced apart from the display screen, wherein certain objects are not eligible to be designated as the target object based on the pointer type; and modifying an appearance of the designated target object on the display screen.

2. The method of claim 1 wherein the step of modifying the appearance of the target object includes the step of changing at least one of the following:

the size of the target object;

the perspective of the target object;

the shape of the target object;

the coloring of the target object;

the style of the target object; or the position of the target object relative to other objects on the display.

3. The method of claim 1 wherein the modifying step further modifies the appearance of the designated target object based upon the pointer type.

4. The method of claim 1 further comprising the step of storing data regarding behavior patterns of a user, and wherein the designating step further designates the target object based upon the stored behavior patterns of the user.

5. The method of claim 1 further comprising the step of storing data regarding usage patterns of an application, and wherein the designating step further designates the target object based upon the stored usage patterns of the application.

6. The method of claim 1 wherein the step of determining a 3-dimensional trajectory of the pointer includes the step of determining a curvature of the 3-dimensional trajectory.

7. The method of claim 6, further including the step of changing the appearance based upon the curvature of the 3-dimensional trajectory such that hidden objects become visible.

8. The method of claim 1 wherein the determining, the 3-dimensional trajectory, designating, and modifying steps are repeated as the pointer moves with respect to the display.

9. The method of claim 8 wherein the designating step includes the step of changing the designated target object.

10. The method of claim 8 wherein the designating step includes the step of un-designating a previously designated target object when the determining step determines that the trajectory is leading away from the previously designated target object.

11. A system comprising:

a processor;

a memory;

an input trajectory element configured to determine a 3-dimensional trajectory of a pointer when the pointer is spaced apart from a display screen of a touch-enabled device, based upon detected 3-dimensional positioning of the pointer over time;

a pointer type determination element configured to determine a type for the pointer; and a predictor/adapter configured to provide a display control signal modifying an appearance of the display screen of the touch-enabled device based upon the determined 3-dimensional trajectory of the pointer, wherein the predictor/adapter is further configured to designate a target object on the display screen based upon the determined 3-dimensional trajectory and the determined pointer type, wherein certain objects are not eligible to be designated as the designated target object based on the determined pointer type, and wherein the predictor/adapter is further configured to provide another control signal for changing an appearance of the designated target object on the display screen.

12. The system of claim 11, wherein the predictor/adapter is further configured to provide the another control signal for changing the appearance of the designated target object based also upon the determined pointer type.

13. A method comprising the steps of:

sensing a pointer when the pointer is spaced apart from a display screen of a touch-enabled device;

determining a position of the pointer in 3-dimensional space over time;

computing a 3-dimensional trajectory of the pointer based upon the determined position over time;

modifying an appearance of the display screen based upon the 3-dimensional trajectory;

determining a pointer type for the pointer;

designating a target object on the display screen based upon the computed 3-dimensional trajectory and the determined pointer type, wherein certain objects are not eligible to be designated as the target object based on the pointer type;

and modifying an appearance of the designated target object on the display screen.

14. The method of claim 13, wherein the step of modifying the appearance of the designated target object further modifies the appearance of the designated target object based upon the determined pointer type.

* * * * *